United States Patent [19]

Weber

[11] 4,118,662

[45] Oct. 3, 1978

[54] APPARATUS INCLUDING BIFREQUENCY ELECTROMAGNETIC WAVE GENERATION MEANS FOR SYMPATHETIC EXCITATION OF DETACHED CONDUCTIVE STRUCTURES

[75] Inventor: Harold James Weber, 20 Whitney Dr., Sherborn, Mass. 01770

[73] Assignee: Harold James Weber, Sherborn, Mass.

[21] Appl. No.: 809,689

[22] Filed: Jun. 24, 1977

[51] Int. Cl.² .............................................. G01V 3/10
[52] U.S. Cl. .......................................... 324/3; 324/67
[58] Field of Search ...................... 324/3, 6, 67, 52, 5; 331/47, 49, 46, 179; 325/163; 340/258 C

[56] References Cited

U.S. PATENT DOCUMENTS

| 1,818,331 | 8/1931 | Jakosky ..................................... 324/6 |
| 2,461,456 | 2/1949 | Usselman ............................... 325/163 |
| 2,642,477 | 6/1953 | Puranen et al. .......................... 324/6 |
| 2,731,598 | 1/1956 | Herbert .................................. 324/52 |
| 3,031,527 | 4/1962 | Barton et al. .................... 325/163 X |
| 3,066,256 | 11/1962 | Rasor ................................. 324/67 X |
| 3,205,441 | 9/1965 | Likel ..................................... 325/163 |
| 3,354,396 | 11/1967 | Whittaker et al. .............. 325/163 X |
| 3,418,572 | 12/1968 | Humphreys ........................... 324/67 |

Primary Examiner—Gerard R. Strecker

[57] ABSTRACT

A method and means is described for a concealed structure locating and surveying exciter apparatus, and more particularly, to a portable device which couples, either by direct or indirect connection, high frequency alternating current energy into a more conductive structure which is usually obscured in a less conductive covert medium. The preferred embodiment provides two different frequency high stability sources of first oscillations the outputs of which are alternately switched or gated by a very low frequency source of second oscillations. The alternating first oscillations are combined in a summing amplifier and caused to drive an output coupling means. The amplified outout is further modulated, usually at an audio frequency rate, by a low frequency source of third oscillations. The result is a composite electromagnetic waveform output which switches alternatively between two distinctly spaced radio frequency signals at a slow, very low frequency rate while the two radio frequency emissions are simultaneously amplitude modulated by a steady pitch audio tone.

14 Claims, 11 Drawing Figures

APPARATUS INCLUDING BIFREQUENCY ELECTROMAGNETIC WAVE GENERATION MEANS FOR SYMPATHETIC EXCITATION OF DETACHED CONDUCTIVE STRUCTURES

BACKGROUND OF INVENTION

Reference is made herein to my copending application Ser. No. 795,194 file date May 9, 1977 for "APPARATUS INCLUDING BIVOLUMETRIC TONE SUBAUDITION MEANS FOR POSITIONALLY SPOTTING AND TRACING SUBJACENTLY CONCEALED CONDUCTIVE STRUCTURES".

DESCRIPTION OF PRIOR ART

In the tracing of concealed structures the method of introducing a constant high frequency alternating current into the structure and subsequently tracing the same with a relative field strength measuring receptor has long been known. Such tracing is oftimes accomplished with either a meter indication of intercepted field strength or through any one of several audio translation means altering either the volume, pitch, or other observable characteristic of an audio tone. These prior art audio indicating means are monophonic in character giving the operator no guidance as to the direction he should next follow.

This invention advances the art in that a signal is injected into the concealed structure which contains a unique electromagnetic waveform capable of being received and converted into an indication to the operator which yields directional information. In one embodiment this directional information is provided in the form of a position indicative stereophonic-like audio indication. This directional information is most helpful in enabling less-skilled operators to effectively employ the tracing apparatus. Furthermore such directional indication can considerably improve the safety of tracing a structure in a hazardous environment when unecessary exploration is to be advoided.

SUMMARY

My invention provides an excitation means for the purpose of acting cooperatively with a separate receptor or translator means the conjunctive purpose of which is to perform as a concealed structure tracing means.

Therefore it is an object of this present invention to provide a novel exciter means which operates to introduce uniquely modulated electromagnetic vibrations into a concealed structure.

It is a further object of this invention to cause electromagnetic vibrations to be setup in a subject structure which have distinct modulation characteristics capable of causing positional indications upon demodulation in a separate cooperative translator means.

It is a further object of this present invention to initiate a plurality of electromagnetic vibrations from a concealed object which have a pattern signature capable of yielding improved positional tracing indications from a separate receptor means.

It is still a further object of this novel invention to provide a composite radio frequency signal which is modulated with intelligence suited for acting upon a separate receiving means to give indication of the approach to or regression from the concealed structure.

In accordance with a principle of this invention, an electromagnetic field is produced in a concealed structure which is caused to contain two similiar yet not identical principal high frequency periods of first and second oscillation which are alternately switched or selected between at a very low frequency rate.

Yet another principle of this invention provides for the amplitude modulation of the said two principal high frequency first and second oscillations by a frequency rate which in a preferred embodiment is at an audio frequency rate.

The foregoing objects and many of the attendent advantages of this instant invention will become more apparent as the same becomes better understood by reference to the following detailed specification description when taken in conjunction with the accompanying drawings, wherein:

FIG. 1 shows a block diagram for a basic embodiment which my novel exciter may take. An inducer, or induction coil 10 is driven by a power amplifier 11.

Figure 1:
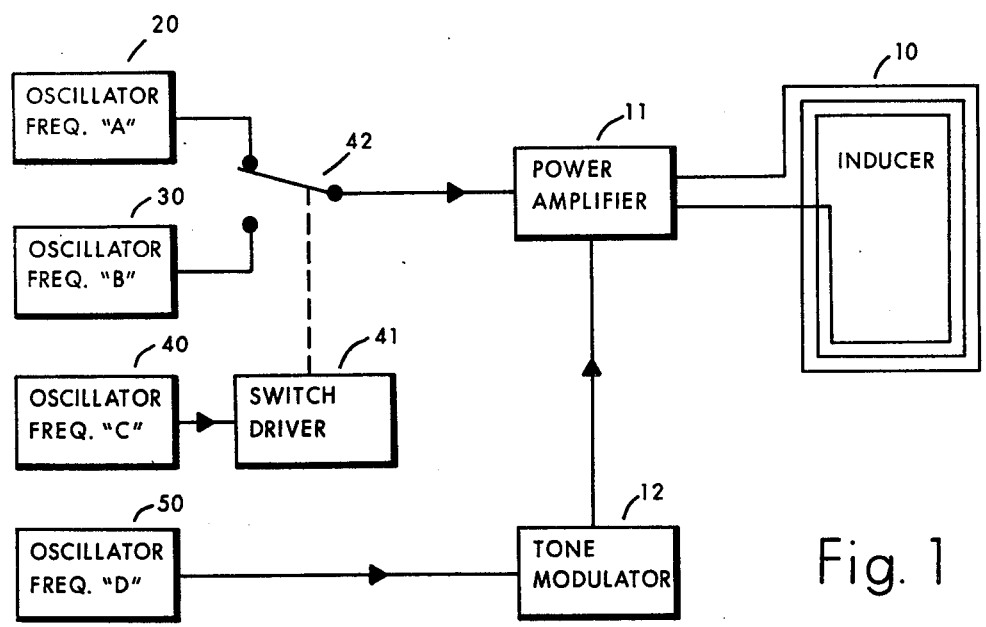
FIG. 1 is a block diagram showing an elementary embodiment for my new invention.

Two first and second radio frequency oscillators 20, 30 are alternately switched between by means 42 to provide a third frequency drive signal to said power amplifier 11. The switching action is controlled by a switch driver 41, the switching rate of which is determined by a forth frequency oscillator 40.

The signal amplified by said power amplifier 11 is further acted upon by a tone modulator 12 which causes the resulting drive signal to the inducer 10 to be amplitude modulated at a fifth frequency rate determined by fifth frequency oscillator 50.

Figure 2:
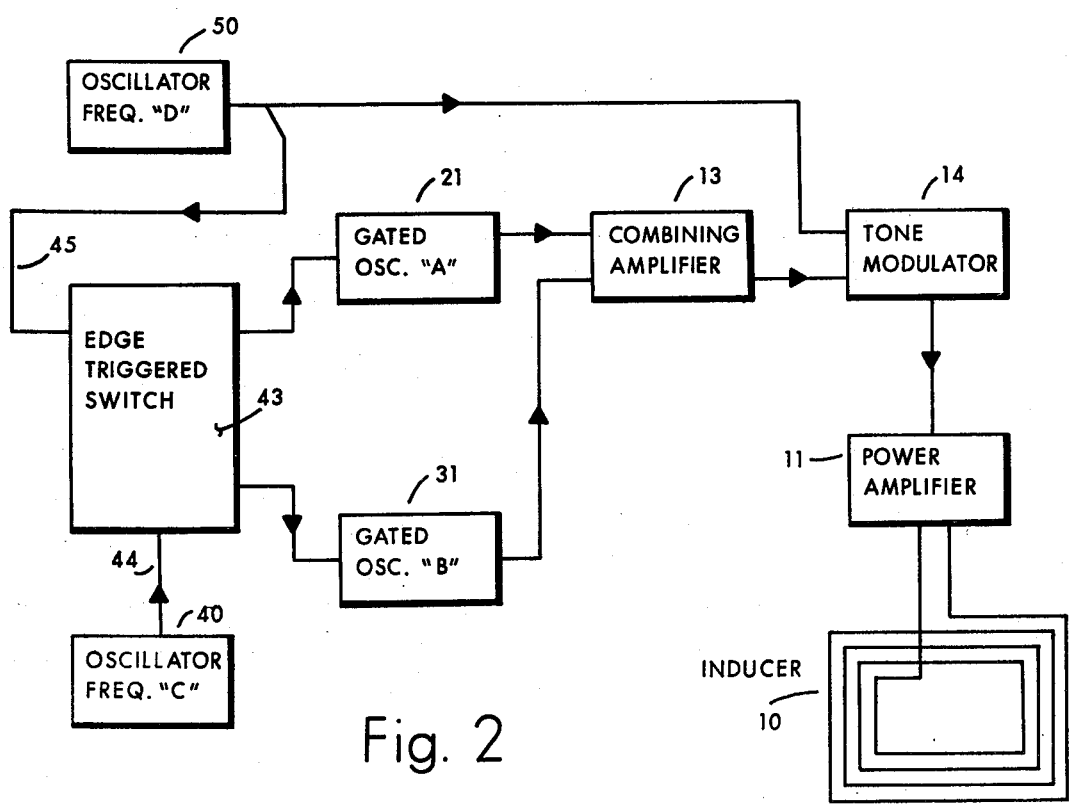
FIG. 2 is a block diagram showing a preferred embodiment for my new invention.

FIG. 2 shows an improved, preferred embodiment for my exciter. In this modelled form a gated first radio frequency "A" oscillator 21 and a gated second radio frequency "B" oscillator 31 serve to drive the inputs of a combining amplifier 13. Said oscillators 21, 31 are alternatively gated "ON" by a synchronized edge triggered switch 43. This action enables oscillator 21 to be "ON" when oscillator 31 is "OFF" and vice versa. The purpose for said edge triggered switch 43 is to cause switching between the said two gated oscillators 21, 31 to only occur when the instantaneous output amplitude from said power amplifier 11 is at a minimum as determined by the tone modulator 14. This controlled switching significantly minimizes the transients and other spurious signals which are typically generated by more random switching means. The said triggered switch 43 operates when a condition set-up signal is fed into input 44 from a fourth frequency switch oscillator 40. The edge triggered switch 43 then awaits the next zero output condition-indicating pulse to feed into input 45 which causes the switch to complement the output lines.

The switching action may be further explained if said triggered switch 43 is a positive edge triggered bistable flip-flop commonly referred to as a "D" flip-flop and exampled by the C-MOS 4013 integrated circuit made by R.C.A. and others. The lines feeding the said gated oscillators 21, 31 are derived from the flip-flop "Q" and "$\overline{Q}$" outputs. The setup signal 44 is fed into the "D" input, while the condition indicating pulse 45 is fed into the CLOCK input. Since the said integrated circuit is positive edge triggered, the condition on the "D" line will be transferred to the "Q" output whenever a positive signal edge occurs from said oscillator 50 on input 45.

Figure 3:
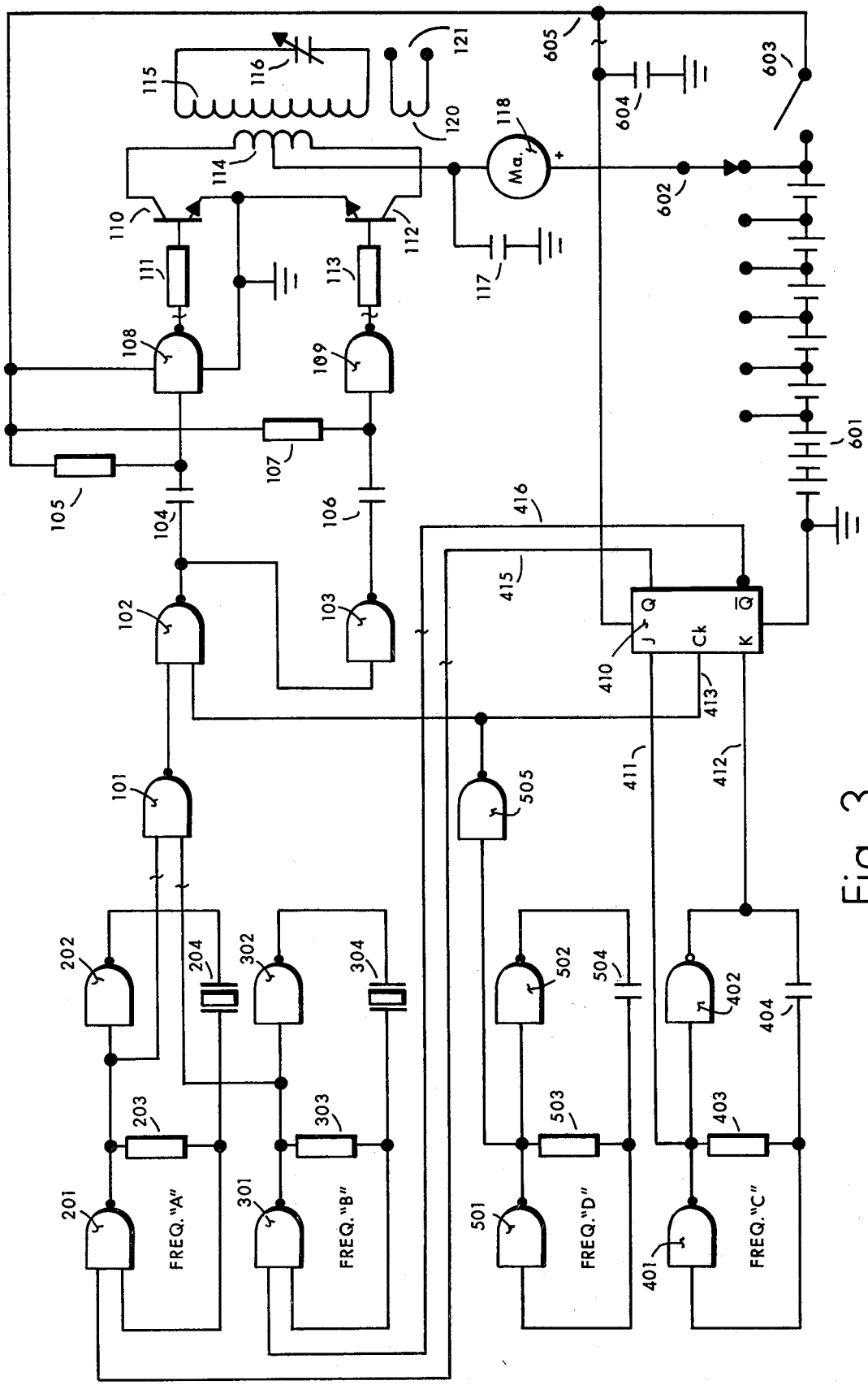
FIG. 3 is a schematic diagram showing a preferred embodiment for my new invention.

FIG. 3 is the schematic for my preferred embodiment which operates effectively. Two crystal controlled gated radio frequency oscillators are employed. The frequency of the second frequency is selected to be somewhat less than twice that of the said first frequency. First radio frequency "A" oscillator consists of a two input NAND gate 201 and inverter 202 together with bias resistor 203 and pizeoelectric crystal 204, which in my model operated at 438.9 kilohertz. Second radio frequency "B" oscillator consists of a two input NAND gate 301 and inverter 302 together with bias resistor 303 and quartz radio crystal 304, which in my model operated at 446.3 kilohertz.

The outputs from the two said oscillators are combined in NAND gate 101. The gating of the two aforesaid radio frequency oscillators is accomplished by the control lines 415, 416 which when LOW or logic "0", disable the respective NAND gate 201, 310 thus inhibiting oscillation. Since the said lines 415, 416 are derived from the "Q" and "$\overline{Q}$" outputs on flip-flop 410 one line will always be HIGH when the other output line is LOW. The flip-flop 410 is an edge triggered "J–K" flip-flop generally well described in literature. The particular flip-flop I have chosen by way of example only is the C-MOS 4027 made by R.C.A. and others. This particular flip-flop clocks on a positive triggered clock edge. In this application, the "J" and "K" inputs 411, 412 are connected to the outputs of two complementing inverters 401, 402 comprising the fourth frequency "C" switch oscillator, or multivibrator in combination with bias resistor 403 and capacitor 404. This fourth frequency oscillator operates around 3 or 4 hertz in this case.

An audio tone fifth frequency oscillator operating near 900 hertz in frequency consists of inverters 501, 502, bias resistor 503, and capacitor 504. The said fifth frequency "D" oscillator serves to drive a buffer inverter 505 for the purpose of improving the pulse risetime prior to application to the clock input 413 of flip-flop 410. The said buffer 505 output also serves to drive one input of NAND gate 102.

The result is that flip-flop 401 will transfer the conditions on the "J" and "K" inputs to the respective "Q" and "$\overline{Q}$" outputs whenever the clock pulse goes positive (positive edge). At the same time, the fifth frequency gating signal willenable said gate 102 and continue to alternately enable and disable the said gate on every fifth frequency half cycle. This results in fifth frequency or, in effect, audio tone modulation of the said third frequency rate signal derived from said combining gate 101 resulting in a composite audio modulated bi-frequency signal at the output of said gate 102.

A differentiating network comprising capacitor 104 and resistor 105 is connected to the output of combining gate 102 together with the input of inverter 103. A similiar differentiating network consisting of capacitor 106 and resistor 107 is similarly connected to the output of said inverter 103. The purpose for the differentiating of the output of said gate 102 and said inverter 103 is to narrow the duty cycle of the pulses inputted to buffer inverters 108 and 109 respectively. This narrowed duty cycle results in a shorter "ON" time for the amplifying transistors 110, 112 connected to the outputs of inverters 108, 109 through base resistors 111, 113 respectively. The "ON" time, through correct selection of the differentiator time constants is less than ninty electrical degrees or in effect just long enough to supply current to the high "Q" inducer loop 115 through primary 114 as may be necessary to overcome losses entailed in the said resonant winding 115, resonant capacitor 116, and the rather loose external inductive coupling as is typically employed in this kind of application. The purpose for this reduced "ON" time operation is mainly to conserve battery energy thereby extending operating time between battery replacement or recharging. An auxilliary external coupling loop 120 is also provided as part of my output coupling arrangement. The purpose for this coupling means is to permit better signal transfer through direct connection of the concealed structure to the terminals 121 if access to the structure proper is possible.

A collector current meter 118 is used for tuneup, with said capacitor 116 adjusted for minimum amplifier (collector) current on said meter 118. With the separation in first and second frequency previously recited it can be expected that, with a said loop 115 of goodly "Q" factor, two observable minimums may occur on said meter 118 reading as said capacitor 116 is adjusted. The correct setting under this condition is at a point midway betwixt the two minimum settings.

Power is provided by the electrochemical cell apparatus, or battery 601. A switch 602 is shown to select various intercell taps so as to reduce the output amplifier operating potential, thus the output power, to the minimum necessary to accomplish the task at hand. This power reduction not only reduces the chances of interference with other equipment, but also causes a significant gain in battery life. Switch 603 controls power to the early stages, while capacitors 117 and 604 serve as high frequency bypass elements.

In the shown diagram in FIG. 3 my intent is that correct power and other connections be realized on all active components, such as flip-flop 401 and the various gates, to assure normal operation.

Figure 4:
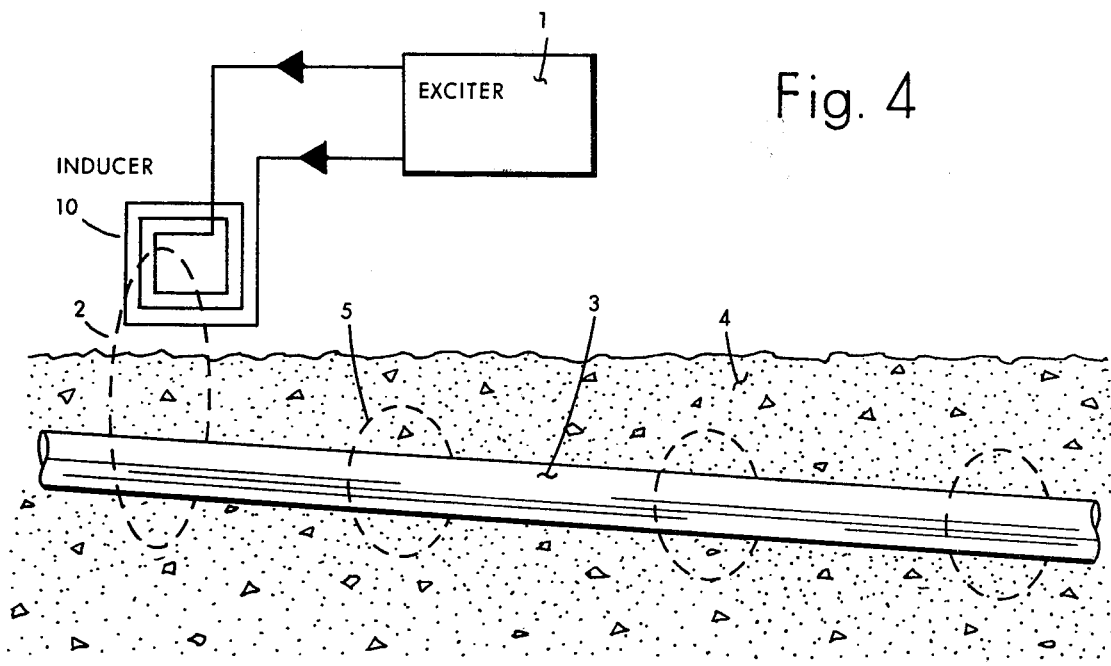
FIG. 4 is a diagrammatic representation showing the coupling of my new exciter into a concealed pipe through inductive coupling.

FIG. 4 illustrates how my exciter may be used for inducing a bifrequency electromagnetic field in a concealed object such as a pipe. As shown the exciter 1 drives the plural third signal frequencies into a common inducer or loop antenna 10 which couples by field lines 2 into buried pipe 3 which is concealed in a covert medium 4. The resulting effect of the said coupling field lines 2 is to cause sympathetic field line 5 to emanate from the said obscured structure 3 throughout it's expanse with nearly equal signal magnitudes at each of several frequencies.

Figure 5:
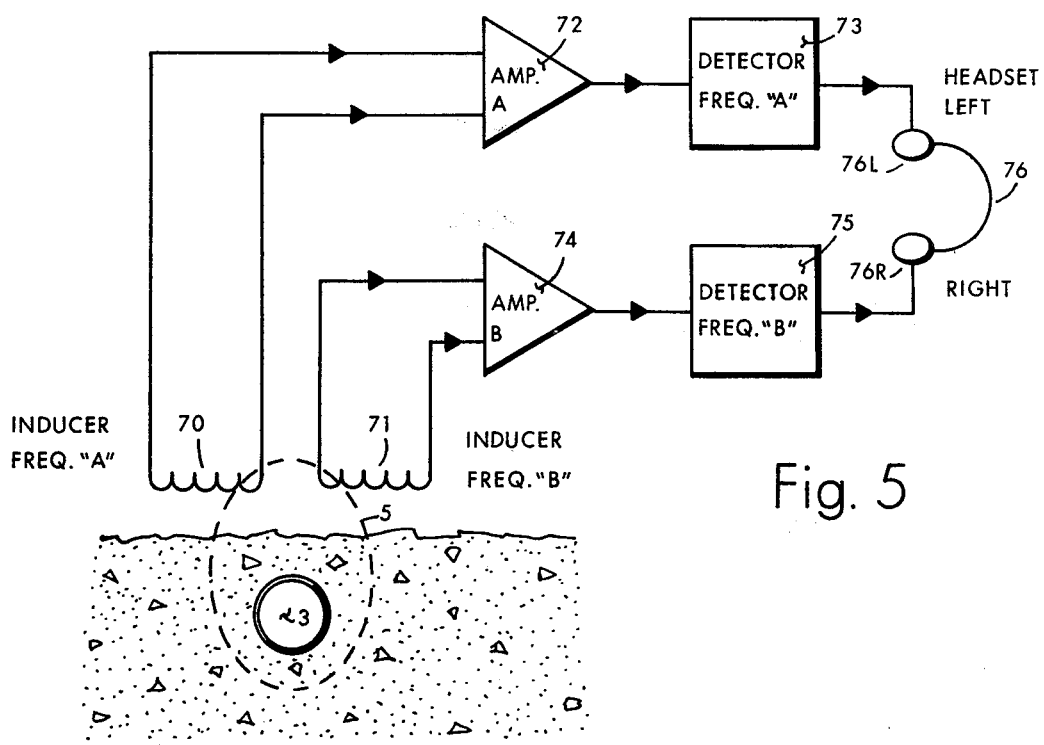
FIG. 5 is a diagrammatic representation showing the embodiment a cooperative receptor may take in an elementary form which can be employed with the subject exciter.

FIG. 5 shows solely for the purpose of illustrating application of my exciter, how a suitable receptor means might be effected. The buried pipe 3 radiates field lines 5 separately induced by my instant exciter. Two pickup inducers 70, 71 are arranged about the said concealed object 3 so as to cut some of the said radiating field lines 5. Inducer 70 is tuned to the exciter first radio frequency signal "A" which could be 438.9 kilohertz, while inducer 71 is tuned to the exciter second radio frequency "B" exampled as 446.3 kilohertz. Two amplifiers 72, 74 responsive to frequency "A" or "B" respectively increase the magnitude of the corresponding inducer output signal. The said amplifiers connect to detector 73 and 75 respectively. The said detectors 73, 75 are operative to demodulate the incoming high frequency signal and drive the headset 76.

The result is that when the said inducers 70, 71 are immediately above the said concealed pipe 3, each inducer receives the same field line intensity, therefore producing equal, albeit alternating, outputs from the two headphones 76L, 76R comprising binaural headset 76.

If the orientation of the inducers is moved such that inducer 70 is more close to the concealed structure, more field lines will cut through inducer 70 and fewer through inducer 71 with the result that the left earphone 76L will produce a greater output volume while the right earphone 76R will diminish in volume.

Exactly the opposite effect can be expected if right inducer 71 is more near the structure. The result is an operator indication capable of inducing a sense of left or right positional sensibility, thus enhancing the speed and accuracy in tracing a concealed structure. The use of my instant inventon with such a receptor means is best accomplished when the said second frequency produced by the exciter is not harmonically related to, but rather somewhat less than twice the said first frequency. The reason for this is because practical exciter, as well as receptor, apparatus can be expected to have enough inherent nonlinearities to cause the harmonic of the said first frequency to be nominally of some measurable strength. The result can be cause for ambiguous receptor indications, loss of receptor range, or both, if the said second frequency is selected to be a multiple, viz harmonic, of the first frequency.

Figure 6:
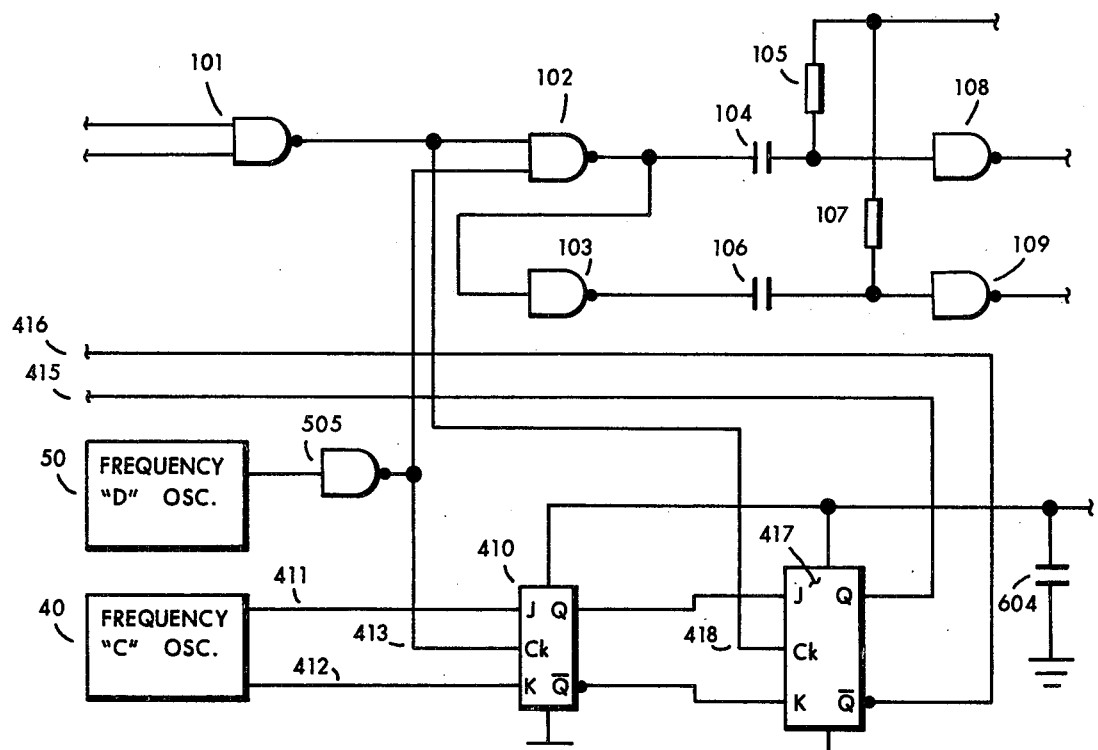
FIG. 6 is a partial schematic diagram showing a variation of my preferred embodiment including a second gated flip-flop for the purpose of synchronizing the alternate switching of the first and second frequency waveform transistions.

FIG. 6 is a partial schematic showing certain changes made to the basic preferred embodiment for my exciter shown in FIG. 3. The purpose of this variation is to show how improved radio frequency output waveform may be attained through the addition of a second "J-K" flip-flop 417. Behavior of this circuit is such that fourth frequency "C" oscillator 40 sets up first "J-K" flip-flop 410. Subsequently the "J" and "K" inputs are transferred to the "Q" and "$\overline{Q}$" outputs respectively on the next positive transistion of the fifth frequency "D" audio oscillator 50 waveform via inverter 505 on line 413. The "Q" and "$\overline{Q}$" outputs from said flip-flop 410 connect directly to setup the "J" and "K" inputs of said second flip-flop 417. This said second flip-flop 417 will accordingly transfer its input states to the "Q" and "$\overline{Q}$" outputs on the very next positive transistion of the frequency signal on the output of combining gate 101 as applied to input line 418 at the flip-flop 417 clock input. The result is the output frequency will be changed only when both the third and fifth frequency waveform are at or near minimum amplitude.

Figure 7:
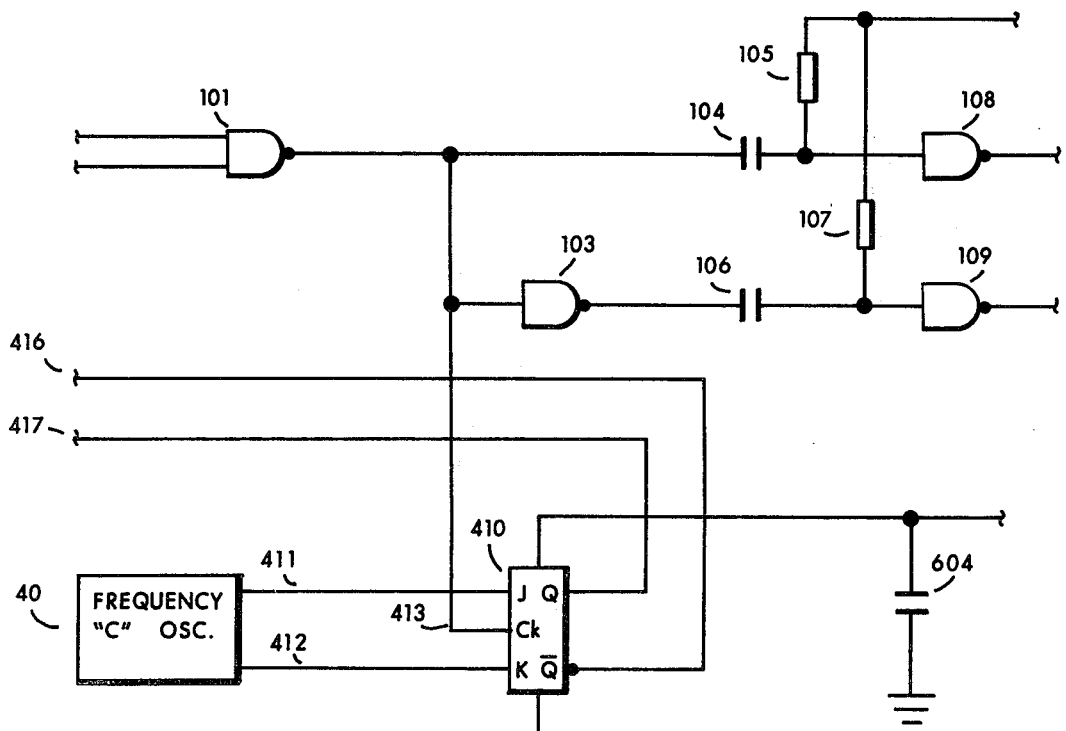
FIG. 7 is a partial schematic diagram showing a variation of my preferred embodiment showing alternate switching of the first and second frequency oscillations by the third frequency waveform transistions when no fifth frequency audio modulation is included.

FIG. 7 is a partial schematic showing certain changes made to the basic preferred embodiment for my exciter shown in FIG. 3. The purpose of this variation is to show how the fifth frequency "D" audio modulation may be deleted, yet retaining the good waveform switching characteristics associated with the minimum amplitude alternate switching action associated with the generic version. In this variation, the fifth freauency oscillator 50 including inverters 501, 502, resistors 503, and capacitor 504 are deleted, together with modulation combining gate 102 and inverter 505. The result is an alternate first and second bifrequency output which is unmodulated. This kind of electromagnetic waveform is desirous with certain receiving translator means depending on meter indications, selfgenerated audio indications, or other like field strength dependent means for conveying positional deviations to the operator. In this variation the flip-flop 410 clock line 413 is driven from the third frequency output of combining gate 101. The reason is to assure that the frequency change from first frequency oscillator "A" to second frequency oscillator "B", and vice versa, will occur only when the high frequency waveform itself is at or near a minimum to improve the output waveform and decrease spurious interference with other services.

Figure 8:
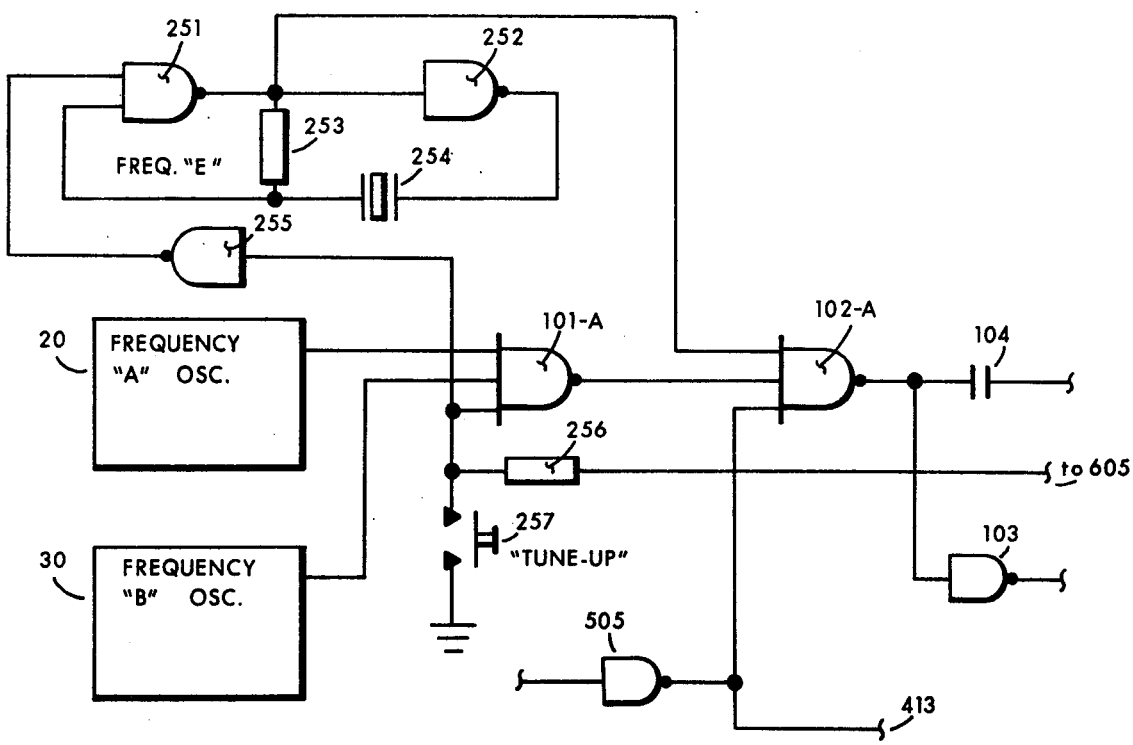
FIG. 8 is a partial schematic diagram showing tuneup calibration circuits.

FIG. 8 is a partial schematic diagram for a variation of my preferred embodiment in FIG. 3 wherein a sixth generating means is employed, operating at sixth frequency "E". The frequency "E" is midway between first frequency "A" and second frequency "B" and is expressed as:

$$f_E = \frac{f_A + f_B}{2}$$

which in my modelled example becomes:

$$f_E = \frac{438.9 + 446.3}{2} = \frac{885.2}{2} = 442.6$$

frequency being in kilohertz.

In this variation combining gates 101, 102 in FIG. 3 are replaced by three input NAND gates 101A, 102A respectively. A frequency "E" generating means oscillator consisting of NAND gate 251 and inverter 252 together with bias resistor 253 and quartz radio crystal 254 operative at frequency $f_E$, or for this example 442.6 kilohertz, connect to one input of gate 102A. One input of gate 251 connects to inverter 255. The purpose of said inverter 255 is to hold the input to gate 251 LOW by virtue of the input of inverter 255 being held HIGH by pullup resistor 256. The said pullup resistor 256 also holds the connected input of combining gate 101A high enabling the incoming first frequency "A" or the second frequency "B" signals to pass. When the TUNE-UP switch 257 is closed to ground, the input to said gate 101A is low inhibiting the first frequency "A" and the second frequency "B" signals. In a like manner the input to said inverter 255 is LOW causing the output as connected to the input of gate 251 to be HIGH. Thereupon sixth frequency "E" oscillator is enabled with the result that the sixth frequency "E" will be outputted through gate 102A. The purpose of this TUNE-UP frequency is to enable the inducer tuning capacitor 116 to be tuned for a minimum, or dip on meter 118 instead of "between two dips" as is the case when both alternating first frequency "A" and second frequency "B" signals are outputted.

Figure 9:
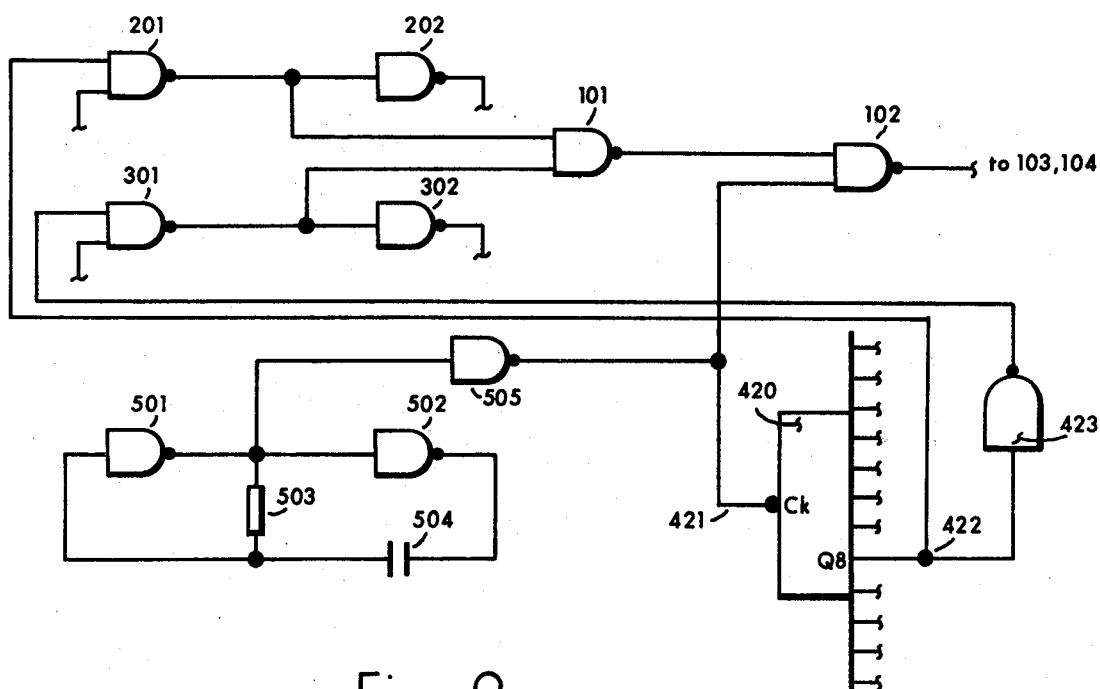
FIG. 9 is a partial schematic diagram showing how the fourth frequency "C" is derived from the fifth frequency "D" oscillator means.

FIG. 9 is a partial schematic diagram for yet another variation of my exciter employing a counter or frequency divider means to derive the fourth frequency "C" from the fifth frequency "D" oscillator. In this embodiment a multistage counter 420 is connected to the fifth frequency clock line 421. In my model I show for purpose of example only the use of a C-MOS 4040 twelve stage integrated circuit counter 420. I show using the Q8 output line giving a division of $2^8$ or 256, which for the exampled fifth frequency "D" of approximately 900 hertz yields a fourth frequency "C" signal of approximately 3.52 hertz. Inverter 423 provides the "$\overline{Q8}$" or inverted line for the complementing control of oscillator gates 201, 301. The minimum signal switching of the oscillators is inherent in this circuit. The main variation would be to add the second flip-flop 417 as in FIG. 6 to provide further synchronization with the third frequency waveform.

Figure 10:
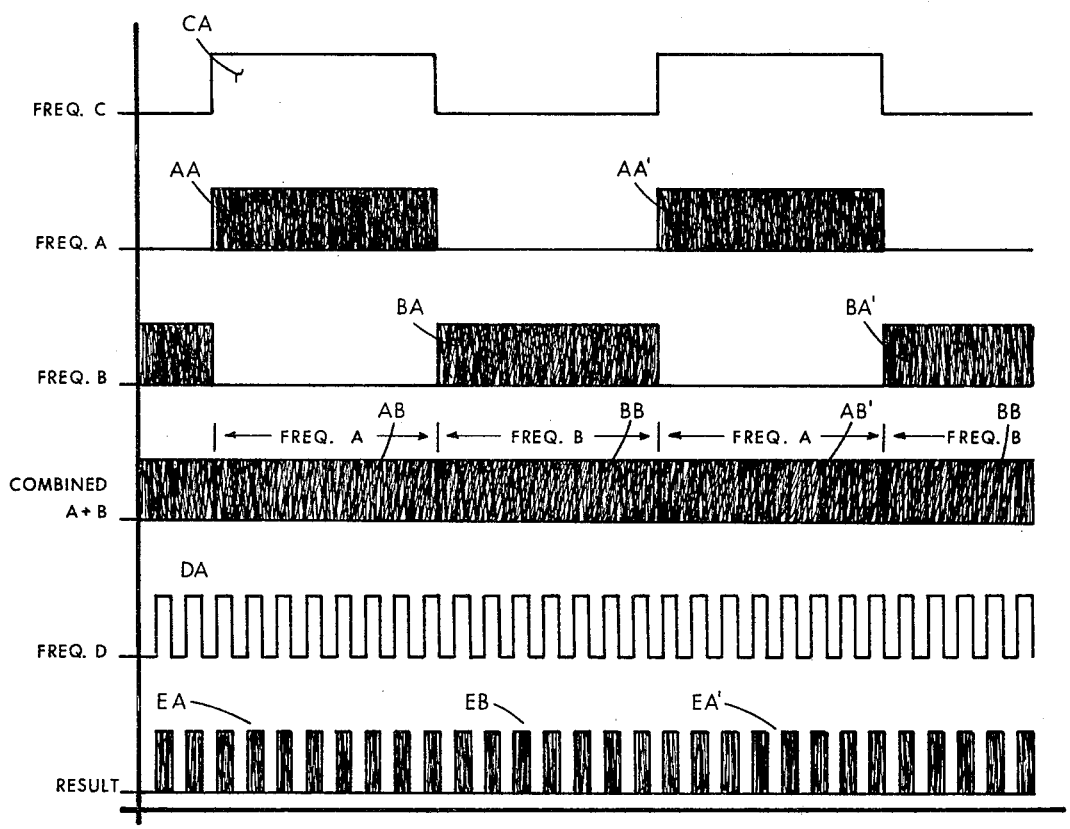

FIG. 10 is a waveform representation of the several signals which appear in my exampled exciter apparatus. The fourth frequency "C" waveform is shown as signal CA. When signal CA is HIGH, the first frequency "A" is enabled as shown by signals AA, AA'. On the other hand, when signal CA is LOW, the second frequency "B" is enabled as shown by signals BA, BA'. The result is the third signal combined "A + B" signal, wherein frequency "A" and frequency "B" are caused to alternately occur. The third frequency is subsequently caused to be modulated, or gated on and off, by a fifth frequency "D" as shown by waveform signals DA. The DA signals act upon the third signal so as to produce a modulated resultant waveform EA, EA', EB, etc.

Figure 11:
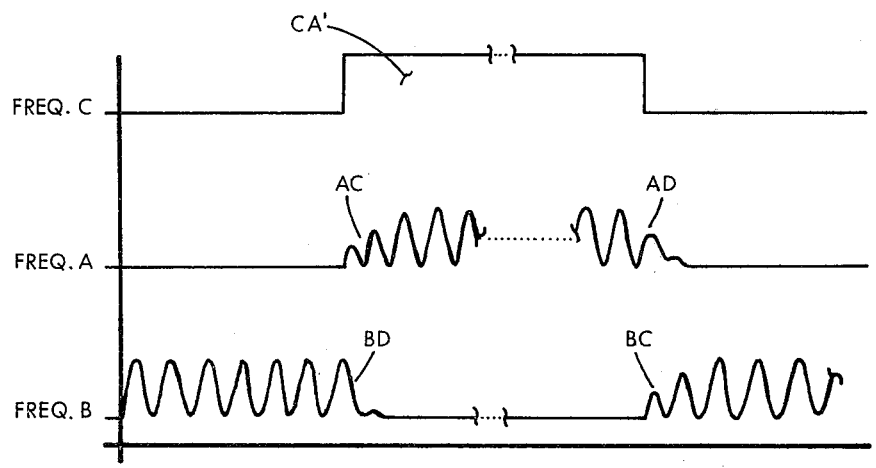

FIG. 11 shows how the fourth frequency "C" gating signal CA' serves to act upon first frequency "A" and second frequency "B". What is shown in some detail is the "zero start" for waveform AC, BC which, due to the circuit novelty, always starts at zero and builds-up. The end of the signals AD, BD on the other hand, are terminated and allowed to ring-down, or decay in waveform magnitude.

While my invention is shown to employ two sources of radio frequency energy in close frequency relationship, this shall not prevent the scope of my new invention from including any plurality of radio frequency sources in any operative frequency combination so long as the intent of my invention is met, that intent being to produce field lines in such a way in a concealed structure so as to enable a suitable receptor apparatus to directionally distinquish and and indicate the location of the lay of the concealed structure.

While my new invention has been shown to use particular types of integrated circuits as function and gain devices, a person skilled in the art could duplicate the same functions from built up circuits consisting of individual components arranged in a multitude of combinations, or with other combinations of integrated circuit gain devices.

While my exciter is shown to use gated oscillators in a so-called master oscillator power amplifier (M.O.P.A.) arrangement this shall not preclude the use of any other operative combination of oscillators and power amplifiers including hetrodyne methods so long as the spirit of my present invention is fulfilled, that being to cause a plurality of alternative selected radio frequency signals to be generated with appropriate efficaciousness to suitably excite a concealed structure for the purpose of locating and surveying the said concealed structure with a cooperative translator means.

Although I show an exampled operating frequency in the vicinity of 440 kilohertz, this shall not be construed as in any way limiting my new apparatus from operation at any other frequency as may be suitable in the electromagnetic spectrum.

The elements comprising my said exciter when properly coupled to each other as in FIG. 3 form a compact package which can principally be contained upon a printed circuit board or like support means within a protective housing. My model which operates successfully and is herein described utilizes the following key components and component values:

| | |
|---|---|
| inducer 115 (includes primary 114 and pickoff secondary 117) | Consists of a flat, rectangular loop antenna about 10 inches wide, 7 1/2 inches high. The primary 114 consists of 5 turns #26 AWG magnet wire closely coupled to the resonant secondary consisting of about 25 turns #26 AWG magnet wire. Pickoff secondary 120 consists of 3 turns AWG #26 magnet wire tightly coupled to the primary 114 and resonant secondary 115. |
| capacitor 116 | 160 picofarad (approx.) |
| integrated circuit 101, 102, 201, 301 | 1/4 CD4011 or 1/4 CD4093 |
| integrated circuit 101A, 102A | 1/3 CD4023 |
| integrated circuit 103, 108, 109, 202, 255, 302, 401, 402, 423, 501, 502, 505 | 1/6 CD4069 |
| integrated circuit 410, 417 | 1/2 CD4027 |
| integrated circuit 420 | CD4040 |
| transistor 110, 112 | 2N2222A |
| pizeoelectric device 204 | 438.9 kilohhertz |
| pizeoelectric device 254 | 442.6 kilohertz |
| pizeoelectric device 304 | 446.3 kilohertz |
| meter, tuning 118 | 0–50 milliamperes D.C. |
| resistor 203, 303, 253 | 47,000 ohms |
| resistor 105, 107 | 39,000 ohms |
| resistor 111, 113 | 820 ohms |
| resistor 403 | 1.2 megohms |
| resistor 503 | 220,000 ohms |
| resistor 256 | 10,000 ohms |
| capacitor 119 | 20 nanofarad |
| capacitor 104, 106 | 180 picofarad |
| capacitor 404, 604 | 100 nanofarads |
| capacitor 504 | 2.7 nanofarad |
| disconnect 603 | S.P.S.T. switch |
| selector, power 602 | S.P., multiposition switch |
| battery 601 | 12 volt D.C. tapped between cells (typical 8- "D"flashlight battery cells). |

The foregoing parameters and values are given by way of example only to assist a person of average skill in the art to duplicate a model of my invention for experimental purposes and are not intended to limit in any way the scope of my invention.

My invention is shown as a buried cable or pipe locating exciter apparatus. This example shall not limit the scope of my invention, but shall also include applications involving the tracing of any of a broad class of structural members as for example reinforcement rods in concrete, wires in walls, underwater concealments traced from a shipboard location, or concealments such as pipeline traced by trailing a cooperative receptor apparatus from a flying machine, or any other such like uses as will occur to those skilled in the art.

My invention is shown by suggestion to be a relatively stationary apparatus when in use while the cooperative receptor is moved about to acheive the tracing function. No restriction is intended however limiting my exciter and the concomitant receptor from being contained and moved about together, as in a vehicular application wherein by exciter is located at one extremity of the body while the cooperative receptor is located at perhaps the other extremity of the body yielding left or right deviation signals to an operator while both the exciter and the receptor move along together with the said vehicle.

What I claim is:

1. Apparatus for bifrequency electromagnetic excitation of a conductive structure in a manner so as to produce nearly equal signal magnitudes throughout the structure at each of several inherently stable frequencies, wherein said apparatus includes in operative combination;
   a. Generating means for generating a first radio frequency signal;
   b. Generating means for generating a second radio frequency signal the frequency of which is higher than, but somewhat less than twice, the said first frequency;
   c. Generating means for generating a fourth frequency signal the frequency of which is substantially lower than the said first frequency;
   d. circuit coupling means having an output terminal means;
   e. Switching means cooperatively connected to said circuit coupling means and said first, second, and fourth signal generating means wherein said switch is responsive to said fourth signal so as to cause the said switching means to alternatively select, in a repetative manner, between the said first and the said second signal generating means thereby producing a third signal comprising either said first or said second signal at the output terminal means of said circuit coupling means;
   f. Radio frequency amplifying means the signal input means of which is operatively connected to said third signal output terminal means so as to amplify the said alternative first and second radio frequency signals produced by said switching means;
   g. Generating means for generating a fifth frequency signal operatively connected so as to modulate in amplitude the said radio frequency amplifier output;
   h. Inducer means operatively connected to said radio frequency amplifier means so as to provide an effective amplified third signal output coupling means wherein said inducer means is, at least, operative for emanating electromagnetic field lines at both said first and said second frequencies; and,
   i. Portable direct current source of power operatively connected to the plural generating and amplifying means comprising the excitation apparatus.

2. The excitation apparatus as in claim 1 wherein said first and said second radio frequency oscillators each employ a pizeoelectric quartz crystal for stabilized frequency determination.

3. The excitation apparatus as in claim 1 wherein said switching means is synchronized so as to transistion when the said third frequency signals produce a minimum instantaneous radio frequency output signal.

4. The excitation apparatus as in claim 3 wherein said switching means includes a triggered second flip-flop the clock input of which is driven from the said third frequency generating means signals for purpose of synchronization.

5. The excitation apparatus as in claim 1 wherein the inducer means includes a resonant radiating loop antenna operative to produce a large electromagnetic field to provide effective coupling to the concealed structure.

6. The excitation apparatus is in claim 1 wherein a sixth frequency signal generating means is included operative so as to produce a sixth frequency related to the said first frequency and the said second frequency so as to provide a nominal radio frequency signal suitable for tuneup of the said radio frequency amplifying means and the said inducer means.

7. The excitation apparatus as in claim 1 wherein direct wired contact connection of the output coupling means tc the concealed structure is provided by an auxiliary external coupling loop associated with the output inducer provided so as to enhance the electrical coupling efficiency of the exciter to the said structure.

8. The excitation apparatus as in claim 1 wherein a source of direct current power is provided for operation of the said radio frequency amplifying means which includes means for adjustment to reduce the total power output from the exciter.

9. The excitation apparatus as in claim 1 wherein a tuning meter is provided for the purpose of enabling ready readjustment of the said output coupling means for most efficient operation and performance.

10. The excitation apparatus as in claim 1 contained in a portable protective housing in a form suited for particular application as a concealed structure locator exciter apparatus.

11. The excitation apparatus as in claim 1, wherein said fifth frequency is lower than said first frequency while higher than said fourth frequency.

12. The excitation apparatus as in claim 11 wherein said switching means is synchronized so as to transistion when the fifth frequency amplitude modulation produces a minimum instantaneous said radio frequency output signal.

13. The excitation apparatus as in claim 11 wherein said switching means consists of a triggered first flip-flop the clock input of which is driven from the said fifth frequency generating means for purpose of synchronization.

14. The excitation apparatus as in claim 11 wherein the said generating means for a fourth frequency signal includes a frequency divider the input of which is obtained from the fifth frequency generating means signal.

* * * * *